(12) United States Patent
Jung et al.

(10) Patent No.: US 9,541,301 B2
(45) Date of Patent: *Jan. 10, 2017

(54) SILENCER FOR A VEHICLE AIR CONDITIONING SYSTEM

(71) Applicant: HALLA VISTEON CLIMATE CONTROL CORP, Daejeon (KR)

(72) Inventors: Hwan Myeong Jung, Daejeon (KR); Jeong Hun Seo, Daejeon (KR); Jae Woo Ko, Daejeon (KR); Nam Joon Lee, Daejeon (KR); Ho Lee, Daejeon (KR); Seung Ho Baek, Daejeon (KR); Dae Keun Park, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,795

(22) Filed: Nov. 3, 2015

(65) Prior Publication Data

US 2016/0084521 A1 Mar. 24, 2016

Related U.S. Application Data

(63) Continuation-in-part of application No. 14/465,988, filed on Aug. 22, 2014, now Pat. No. 9,188,360.

(30) Foreign Application Priority Data

| Aug. 23, 2013 | (KR) | 10-2013-0100485 |
| Sep. 4, 2013 | (KR) | 10-2013-0105961 |
| Jan. 7, 2014 | (KR) | 10-2014-0001813 |

(51) Int. Cl.
*F24F 13/24* (2006.01)
*B60H 1/00* (2006.01)

(52) U.S. Cl.
CPC ........... *F24F 13/24* (2013.01); *B60H 1/00571* (2013.01); *B60H 2001/006* (2013.01); *F24F 2013/245* (2013.01)

(58) Field of Classification Search
CPC ....................................................... F24F 13/24
(Continued)

(56) References Cited

U.S. PATENT DOCUMENTS

| 2,495,693 A | * | 1/1950 | Annis | ...................... F16L 55/05 |
| | | | | 138/26 |
| 2,875,787 A | * | 3/1959 | Evans | ................... F16L 55/052 |
| | | | | 138/30 |

(Continued)

*Primary Examiner* — Forrest M Phillips
(74) *Attorney, Agent, or Firm* — Fraser Clemens Martin & Miller LLC; James D. Miller (57) ABSTRACT

A silencer for a vehicle air conditioning system is designed to reduce a noise and a vibration of a compressor transmitted into a vehicle room along coolant pipes. The silencer includes a silencer body tube and an external resonance tube. The silencer body tube is installed between the coolant pipes wherein a coolant gas flowing along the coolant pipes passes through the silencer body tube, the silencer body tube including one or more resonance holes formed on an outer circumferential surface of the silencer body tube. The external resonance tube is installed on the outer circumferential surface of the silencer body tube wherein a resonance chamber for absorbing a vibration and a noise of a coolant gas flowing through the silencer body tube is defined between the outer circumferential surface of the silencer body tube and the external resonance tube.

18 Claims, 9 Drawing Sheets

(58) Field of Classification Search
USPC .......................................................... 181/224
See application file for complete search history.

(56) References Cited

U.S. PATENT DOCUMENTS 8,434,586 B2 * 5/2013 Pawelski ............... F04C 29/065
    181/175
9,188,360 B2 * 11/2015 Jung ....................... F24F 13/24

* cited by examiner

SILENCER FOR A VEHICLE AIR CONDITIONING SYSTEM

CROSS-REFERENCE TO RELATED APPLICATIONS

This patent application is a continuation-in-part patent application of U.S. Pat. application Ser. No. 14/465,988 filed Aug. 22, 2014 which claims priority to Korean Patent Application No. 10-2013-0100485 dated Aug. 23, 2013, Korean Patent Application No. 10-2013-0105961 dated Sep. 4, 2013, and Korean Patent Application No. 10-2014-0001813 dated Jan. 7, 2014, each of which is hereby incorporated herein by reference in its entirety.

FIELD OF THE INVENTION

The present invention relates to a silencer for a vehicle air conditioning system and, more particularly, to a silencer for a vehicle air conditioning system capable of efficiently reducing a vibration and a noise of a compressor without impairing the fluidity of a coolant while suppressing stagnation of a compressor lubricant.

BACKGROUND OF THE INVENTION

Noise is one major cause of reducing vehicle ride comfort. There are many different kinds of noises generated in a motor vehicle, including a noise of an air conditioner. The noise of an air conditioner is generated in a process of compressing a coolant in a compressor. If the noise is introduced into a vehicle room, vehicle ride comfort is significantly reduced.

In particular, a vibration and a noise generated in a compressor are transmitted into a vehicle room along a coolant and a coolant pipe. Due to the vibration and the noise thus transmitted, a vehicle occupant residing within a vehicle room receives a severe stress and feels fatigue. Thus, the vibration and the noise reduce vehicle ride comfort and significantly hinder safe driving. Accordingly, the noise generated from the compressor of the vehicle air conditioning system needs to be reduced in order to improve vehicle ride comfort and to assure safe driving.

As a method of reducing a noise generated in a compressor, there is available a technology in which a silencer is installed in a coolant pipe connected to the compressor.

Figure 1:
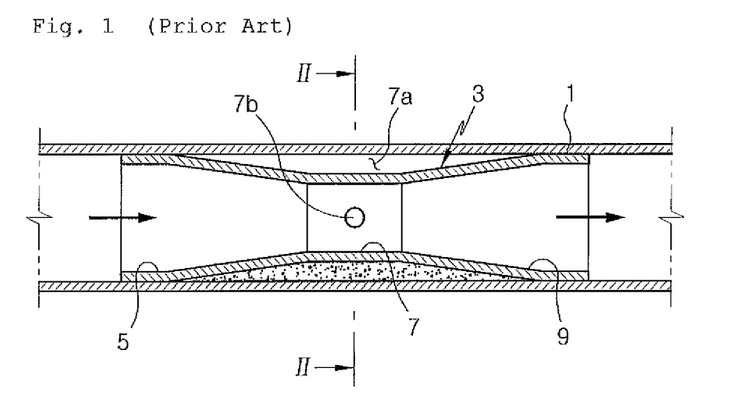
FIG. 1 is a sectional view showing a conventional silencer for a vehicle air conditioning system.

As shown in FIG. 1, this technology makes use of a Helmholtz resonance principle and has a structure in which a resonance tube 3 is installed within a coolant pipe 1. The resonance tube 3 includes a coolant introduction portion 5, a neck portion 7 whose diameter gradually decreases from the coolant introduction portion 5, and a coolant discharge portion 9 whose diameter gradually increases from the neck portion 7. A resonance chamber 7a is defined between the outer circumferential surface of the neck portion 7 and the inner circumferential surface of the coolant pipe 1.

In this resonance tube 3, during a process of introducing and discharging a coolant gas having a high temperature and a high pressure, a vibration and a noise is absorbed into the resonance chamber 7a through a resonance hole 7b formed in the neck portion 7. As a result, the vibration and the noise generated in the compressor are prevented from being transmitted into a vehicle room through the coolant and the coolant pipe. This makes it possible to prevent deterioration of vehicle ride comfort which may be caused by the vibration and the noise generated in the compressor.

In the conventional air conditioning system mentioned above, the coolant gas having a high temperature and a high pressure should pass through the resonance tube 3 having a small diameter. This leads to a sharp decrease in the coolant fluidity, which in turn results in a decrease in the vehicle room cooling performance.

Figure 2:
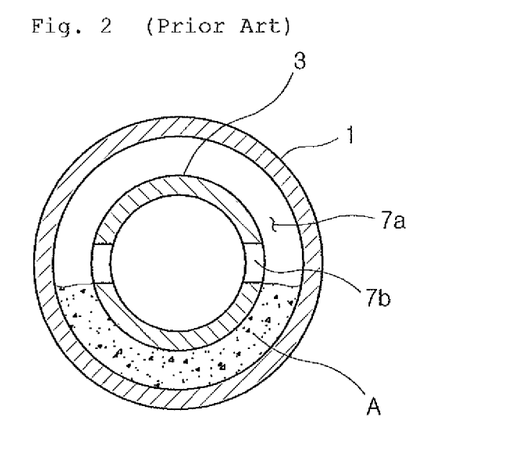
FIG. 2 is a sectional view taken along line II-II in FIG. 1.

Oil for lubricating the compressor is contained in the coolant gas. As shown in FIG. 2, the oil passing through the neck portion 7 of the resonance tube 3 is introduced through the resonance hole 7b and is stagnated in the resonance chamber 7a as indicated by "A". This reduces the performance of the compressor and significantly reduces the noise absorption performance of the resonance chamber 7a.

Particularly, oil shortage occurs in the compressor due to the stagnation of the oil in the resonance chamber 7a. This may drastically reduce the compressor performance and may cause trouble in the compressor.

The stagnation of the oil in the resonance chamber 7a leads to a decrease in the effective volume of the resonance chamber 7a and a sharp reduction in the noise absorption performance of the resonance chamber 7a. As a consequence, the efficiency of reducing the noise and the vibration of the compressor is significantly reduced.

SUMMARY OF THE INVENTION

In view of the above-noted problems, it is an object of the present invention to provide a silencer for a vehicle air conditioning system capable of efficiently absorbing a vibration and a noise of a compressor transmitted through a coolant and a coolant pipe without impairing the coolant fluidity.

Another object of the present invention is to provide a silencer for a vehicle air conditioning system capable of efficiently reducing a vibration and a noise of a compressor without impairing the vehicle room cooling performance.

A further object of the present invention is to provide a silencer for a vehicle air conditioning system capable of efficiently absorbing a vibration and a noise of a compressor transmitted through a coolant and a coolant pipe while preventing stagnation of oil.

A still further object of the present invention is to provide a silencer for a vehicle air conditioning system capable of suppressing a reduction in the compressor performance and a reduction in the vibration/noise absorption rate, which may be caused by stagnation of oil.

In order to achieve the above objects, the present invention provides a silencer for a vehicle air conditioning system designed to reduce a noise and a vibration of a compressor transmitted into a vehicle room along coolant pipes (30), including:

a silencer body tube installed between the coolant pipes such that a coolant gas flowing along the coolant pipes passes through the silencer body tube, the silencer body tube including one or more resonance holes formed on an outer circumferential surface of the silencer body tube; and an external resonance tube installed on the outer circumferential surface of the silencer body tube such that a resonance chamber for absorbing a vibration and a noise of a coolant gas flowing through the silencer body tube is defined between the outer circumferential surface of the silencer body tube and the external resonance tube, the silencer body tube configured to restrain compressor-lubricating oil introduced into the resonance chamber through the resonance holes from being stagnated in the resonance chamber.

In the silencer for a vehicle air conditioning system according to the present invention, the resonance chamber is formed outside the silencer body tube. This makes it possible to efficiently absorb a vibration and a noise of a coolant gas without having to reduce the inner diameter of the silencer body tube.

Since the vibration and the noise of the coolant gas can be efficiently absorbed without having to reduce the inner diameter of the silencer body tube, it is possible to efficiently absorb the vibration and the noise of the coolant gas without impairing the fluidity of the coolant gas flowing through the coolant pipe.

Just as the vibration and the noise of the coolant gas can be efficiently absorbed without impairing the fluidity of the coolant gas, it is also possible to efficiently reduce the vibration and the noise of the compressor without impairing the vehicle room cooling performance.

According to the present invention, the oil introduced into the resonance chamber is allowed to flow down in the gravity direction and is discharged to the silencer body tube and the coolant pipe. It is therefore possible to prevent stagnation of oil in the resonance chamber.

Since the stagnation of oil in the resonance chamber can be prevented, it is possible to suppress a reduction in the compressor performance and a reduction in the vibration/noise absorption rate, which may be caused by the stagnation of oil in the resonance chamber.

The accurate assembling position of the external resonance tube is marked on the silencer body tube in advance. The external resonance tube is assembled on the basis of the mark. It is therefore possible to rapidly and accurately assemble the external resonance tube in a correct position.

Just as the external resonance tube can be rapidly and accurately assembled in a correct position, it is possible to perform the assembling work of the external resonance tube in an easy and rapid manner and to precisely arrange the external resonance tube with respect to the resonance hole.

Since the assembling work of the external resonance tube can be performed in an easy and rapid manner and since the external resonance tube can be accurately assembled in a correct position, it is possible to enhance the productivity and to significantly improve the noise absorption performance of the silencer.

In one embodiment of the invention, a silencer for reducing noise and vibration transmitted through a coolant pipe conveying a coolant gas and a lubricating oil therethrough comprises a silencer body tube and an external resonance tube. The silencer body tube includes at least one resonance hole formed in an outer circumferential surface thereof. The external resonance tube is disposed around the outer circumferential surface of the silencer body tube, wherein a resonance chamber for absorbing a vibration and a noise of the coolant gas flowing through the silencer body tube is defined between the outer circumferential surface of the silencer body tube and the external resonance tube. The at least one resonance hole provides fluid communication between the silencer body tube and the resonance chamber and lubricating oil introduced into the resonance chamber flows downward in a gravity direction and is discharged into the silencer body tube through the at least one resonance hole.

In another embodiment of the invention, a silencer body tube includes at least one resonance hole formed in an outer circumferential surface thereof, wherein the silencer body is disposed coaxially with and in fluid communication with the coolant pipe to cause the coolant gas flowing through the coolant pipe to flow through the silencer body tube. The silencer body tube has an inner diameter substantially equal to the inner diameter of the coolant pipe. An external resonance tube is disposed around the outer circumferential surface of the silencer body tube, wherein a resonance chamber for absorbing a vibration and a noise of the coolant gas flowing through the silencer body tube is defined between the outer circumferential surface of the silencer body tube and the external resonance tube and each of the at least one resonance holes provides fluid communication between the silencer body tube and the resonance chamber. One of the resonance holes is formed in a gravity direction lowermost portion of the silencer body tube surrounded by the resonance chamber and lubricating oil introduced into the resonance chamber flows downward in a gravity direction and is discharged into the silencer body tube through the one resonance hole.

BRIEF DESCRIPTION OF THE DRAWINGS

The above and other objects and features of the present invention will become apparent from the following description of preferred embodiments, given in conjunction with the accompanying drawings.

DETAILED DESCRIPTION OF THE INVENTION

Certain preferred embodiments of a silencer for a vehicle air conditioning system according to the present invention will now be described in detail with reference to the accompanying drawings.

First Embodiment

Figure 3:
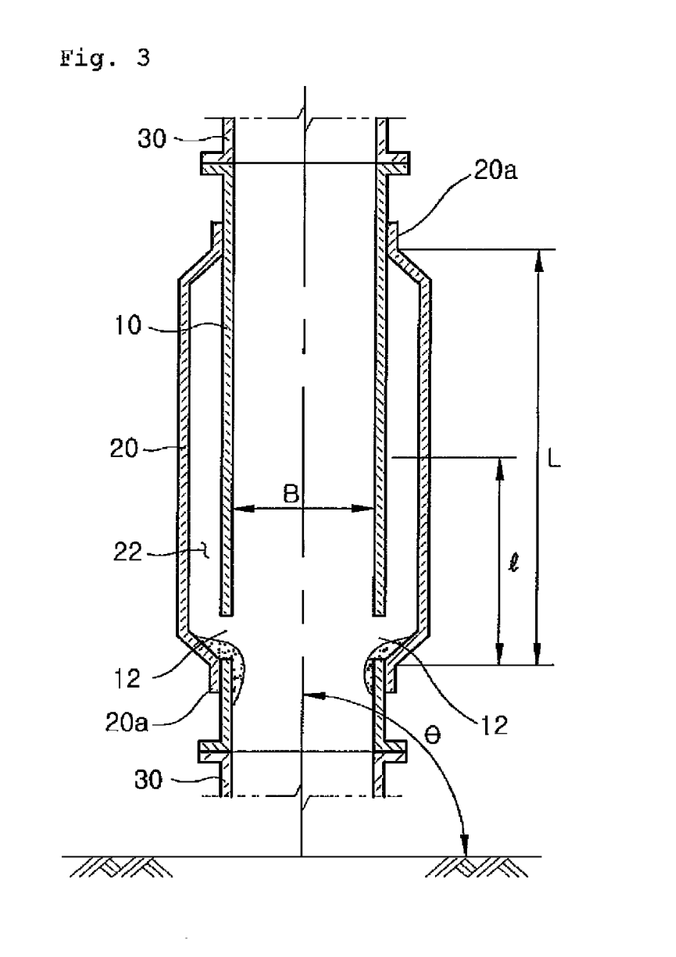
FIG. 3 is a sectional view showing a silencer for a vehicle air conditioning system according to a first embodiment of the present invention.

Referring first to FIG. 3, a silencer for a vehicle air conditioning system according to the present invention includes a silencer body tube 10 and an external resonance tube 20 installed on an outer circumferential surface of the silencer body tube 10.

The silencer body tube 10 is arranged between coolant pipes 30 and is equal in inner diameter B to the coolant pipes 30. A coolant gas having a high temperature and a high pressure, which flows through the coolant pipes 30, is introduced into the silencer body tube 10. Since the silencer body tube 10 has an inner diameter B equal to the inner diameter of the coolant pipes 30, the coolant gas flowing through the coolant pipes 30 passes through the silencer body tube 10 with little flow resistance. This means that the silencer body tube 10 does not impair the fluidity of the coolant gas flowing therethrough.

The silencer body tube 10 is installed at an inclination of specific angle θ with respect to a ground surface. For example, the silencer body tube 10 is installed at an angle of about 90 degrees with respect to the ground surface.

In the present embodiment, the silencer body tube 10 is formed independently of the coolant pipes 30 and is installed between the coolant pipes 30. However, if necessary, the coolant pipes 30 may be used as the silencer body tube 10. In this case, it is possible to reduce the manufacturing costs and the number of manufacturing steps. This helps save the costs involved in manufacturing the silencer.

The external resonance tube 20 is fixedly secured to the outer circumferential surface of the silencer body tube 10 having a specific inclination angle θ with respect to the ground surface. The intermediate portion of the external resonance tube 20 is spaced apart from the outer circumferential surface of the silencer body tube 10. The opposite end portions of the external resonance tube 20 are air-tightly fixed to the outer circumferential surface of the silencer body tube 10. Thus, a resonance chamber 22 is defined between the silencer body tube 10 and the external resonance tube 20. As clearly shown, a volume of the resonance chamber 22 is defined and fixed between the silencer body tube 10 and the external resonance tube 20.

The external resonance tube 20 includes end fixing portions 20a having a diameter smaller than the diameter of the intermediate portion thereof. The end fixing portions 20a are welded to the outer circumferential surface of the silencer body tube 10 such that the intermediate portion of the external resonance tube 20 is spaced apart from the outer circumferential surface of the silencer body tube 10.

In the present embodiment, the silencer body tube 10 has one or more resonance holes 12 formed in the thickness direction thereof. The resonance holes 12 are formed to extend from the inside of the silencer body tube 10 toward the resonance chamber 22 such that a vibration and a noise of a coolant gas flowing through the silencer body tube 10 are transmitted into and absorbed by the resonance chamber 22.

Accordingly, it is possible to prevent the vibration and the noise of the coolant gas from being transmitted into a vehicle room along the coolant pipes 30. This makes it possible to suppress impairment of vehicle ride comfort which may be caused by the vibration and the noise of the coolant gas.

It is desired that the number of the resonance holes 12 is two or more. The resonance holes 12 are formed in the silencer body tube 10 so as to communicate with the resonance chamber 22. It is preferred that the resonance holes 12 are formed in a portion of the silencer body tube 10 corresponding to a gravity-direction lower region of the resonance chamber 22 having a length C of one half or less of a total length L of the resonance chamber 22.

Also desired, the resonance holes 12 are formed in a portion of the silencer body tube 10 corresponding to a gravity-direction lowermost region of the resonance chamber 22 having the total length L.

The reason for employing this configuration is to make sure that, even if compressor-lubricating oil mixed in the coolant gas is introduced into the resonance chamber 22, the oil is allowed to flow down in the gravity direction and is discharged into the silencer body tube 10 through the resonance holes 12.

This makes it possible to prevent the compressor-lubricating oil from stagnating within the resonance chamber 22. As a result, it is possible to suppress a reduction in the compressor performance and a reduction in the vibration/noise absorption rate, which may be caused by the stagnation of the oil in the resonance chamber 22.

Second Embodiment

Figure 4:
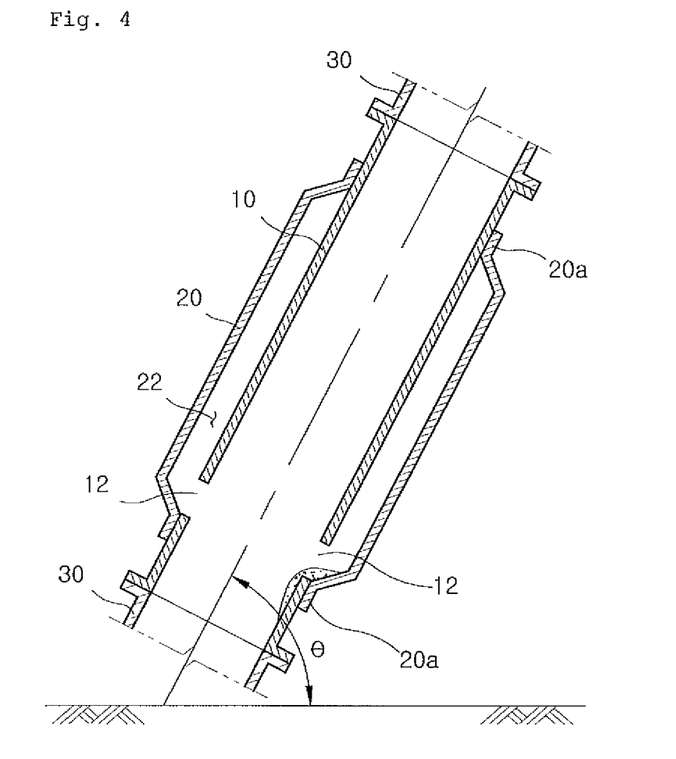
FIG. 4 is a sectional view showing a silencer for a vehicle air conditioning system according to a second embodiment of the present invention.

Next, a silencer for a vehicle air conditioning system according to a second embodiment of the present invention will be described with reference to FIG. 4.

In the silencer according to the second embodiment, the silencer body tube 10 is installed at an angle of about 60 degrees with respect to the ground surface. As the silencer body tube 10 is installed at an angle of about 60 degrees in this way, the external resonance tube 20 existing around the silencer body tube 10 is also installed at an angle of about 60 degrees with respect to the ground surface. Thus, the silencer as a whole is installed at an angle of about 60 degrees with respect to the ground surface.

According to the silencer configured as above, just like the silencer shown in FIG. 3, it is possible to prevent the compressor-lubricating oil from stagnating within the resonance chamber 22. As a result, it is possible to suppress a reduction in the compressor performance and a reduction in the vibration/noise absorption rate, which may be caused by the stagnation of the oil in the resonance chamber 22. As clearly shown, a volume of the resonance chamber 22 is defined and fixed between the silencer body tube 10 and the external resonance tube 20.

Figure 4A:
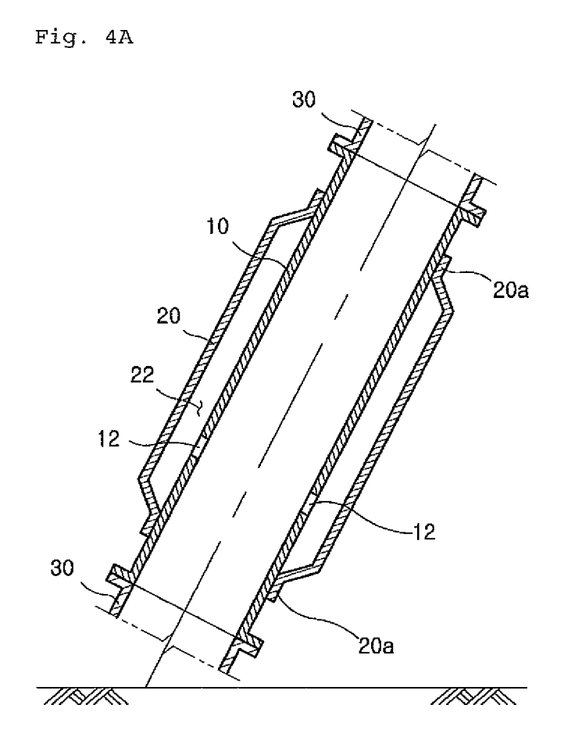
FIG. 4A is a sectional view showing a modified position of resonance holes of the silencer according to the second embodiment illustrated in FIG. 4.

In some cases, as shown in FIG. 4A, the resonance holes 12 may be formed in a gravity upper, higher portion, or non-gravity-direction lowermost region of the silencer body tube 10. If compressor-lubricating oil mixed in the coolant gas is introduced into the resonance chamber 22 through the resonance holes 12, the oil is stagnated within the resonance chamber 22 and is accumulated up to a level of the gravity-direction lowermost resonance hole 12. By forming the resonance hole 12 in the lowermost position in the gravity direction, it is possible to lower the level of the oil stagnating within the resonance chamber 22. This makes it possible to minimize an amount of the oil stagnating within the resonance chamber 22. As a result, it is possible to suppress a reduction in the compressor performance and a reduction in the vibration/noise absorption rate, which may be caused by the stagnation of the oil in the resonance chamber 22.

The resonance holes 12 further include one of the resonance holes 12 formed in a gravity-direction higher than the resonance hole 12 formed in the lowermost position in the gravity direction of the silencer body tube 10. There is a fear that the resonance hole 12 formed in the lowermost position in the gravity direction of the silencer body tube 10 is clogged by the oil stagnating within the resonance chamber 22. In this case, the vibration and the noise generated within the silencer body tube 10 can be introduced into the resonance chamber 22 through the resonance hole 12 formed in the gravity-direction higher than the resonance hole 12 formed in the lowermost position in the gravity direction of the silencer body tube 10.

Favorable results have been obtained when the resonance hole 12 formed in the gravity-direction higher than the resonance hole 12 formed in the lowermost position in the gravity direction of the silencer body tube 10 is formed in the top surface portion of the silencer body tube 10. As clearly shown, a volume of the resonance chamber 22 is defined and fixed between the silencer body tube 10 and the external resonance tube 20.

Third Embodiment

Figure 5:
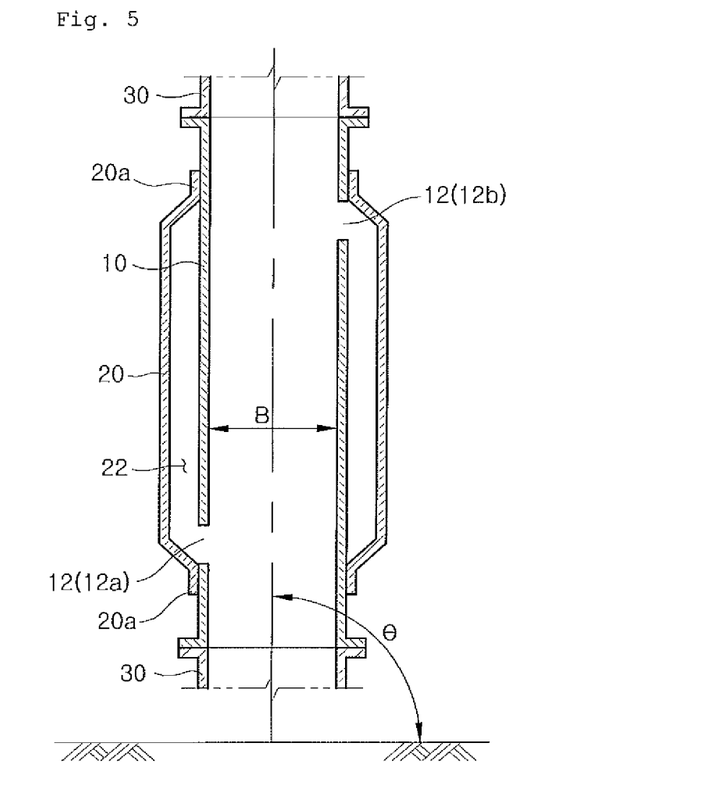
FIG. 5 is a sectional view showing a silencer for a vehicle air conditioning system according to a third embodiment of the present invention.

Next, a silencer for a vehicle air conditioning system according to a third embodiment of the present invention will be described with reference to FIG. 5.

In the silencer according to the third embodiment, the silencer body tube 10 has a plurality of resonance holes 12. The resonance holes 12 include a resonance hole 12a formed in a gravity-direction lower portion of the silencer body tube 10 and a resonance hole 12b formed in a gravity-direction upper portion of the silencer body tube 10.

In particular, the resonance hole 12a is formed in a gravity-direction lowermost portion of the silencer body tube 10. The resonance hole 12b is formed in a gravity-direction uppermost portion of the silencer body tube 10.

The reason for employing this configuration is to make sure that, even when the silencer body tube 10 is upside down in a process of assembling the silencer body tube 10 with the coolant pipes 30, at least one of the resonance holes 12 is always arranged at the gravity-direction lower side of the resonance chamber 22. This ensures that the oil introduced into the resonance chamber 22 is smoothly discharged from the resonance chamber 22.

Accordingly, even if the silencer body tube 10 is upside down in an assembling process, it is possible to prevent the compressor-lubricating oil from stagnating within the resonance chamber 22. As a result, it is possible to suppress a reduction in the compressor performance and a reduction in the vibration/noise absorption rate, which may be caused by the stagnation of the oil in the resonance chamber 22. As clearly shown, a volume of the resonance chamber 22 is defined and fixed between the silencer body tube 10 and the external resonance tube 20.

Fourth Embodiment

Next, a silencer for a vehicle air conditioning system according to a fourth embodiment of the present invention will be described with reference to FIGS. 6-9.

Figure 6:
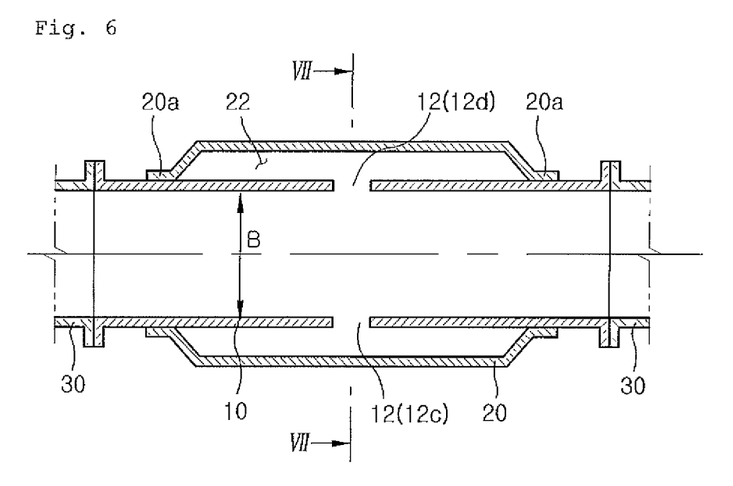
FIG. 6 is a sectional view showing a silencer for a vehicle air conditioning system according to a fourth embodiment of the present invention.

Referring to FIG. 6, the silencer according to the fourth embodiment includes a silencer body tube 10 horizontally installed in a parallel relationship with a ground surface.

As the silencer body tube 10 is horizontally installed in this way, the external resonance tube 20 existing around the silencer body tube 10 is also horizontally installed. Thus, the silencer as a whole is horizontally installed in a parallel relationship with the ground surface.

In the silencer according to the fourth embodiment, the silencer body tube 10 has a plurality of resonance holes 12 formed therethrough. The resonance holes 12 include a resonance hole 12c formed in a bottom surface portion of the silencer body tube 10 corresponding to a gravity-direction lowermost region of the resonance chamber 22.

Figure 7:
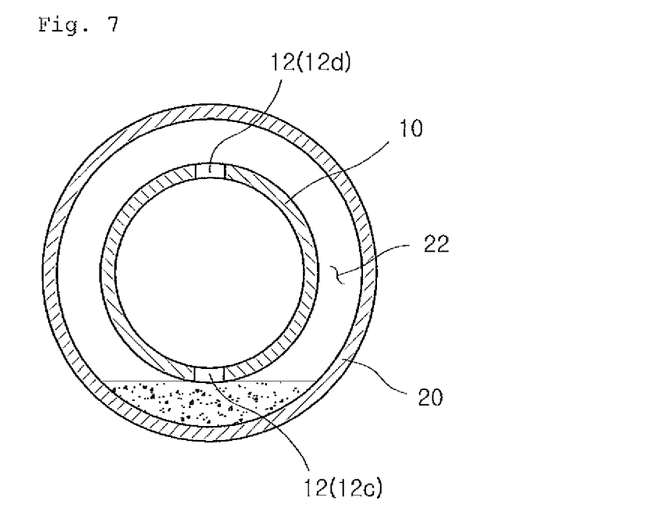
FIG. 7 is a sectional view taken along line VII-VII in FIG. 6.

If compressor-lubricating oil mixed in the coolant gas is introduced into the resonance chamber 22 through the resonance holes 12, the oil is stagnated within the resonance chamber 22 and is accumulated up to a level of the resonance hole 12c as shown in FIG. 7. By forming the resonance hole 12c in the lowermost position in the gravity direction, it is possible to lower the level of the oil stagnating within the resonance chamber 22. This makes it possible to minimize the amount of the oil stagnating within the resonance chamber 22. As a result, it is possible to suppress a reduction in the compressor performance and a reduction in the vibration/noise absorption rate, which may be caused by the stagnation of the oil in the resonance chamber 22.

The plurality of resonance holes 12 further includes a resonance hole 12d preferably formed higher than the resonance hole 12c formed in the bottom surface portion of the silencer body tube 10. More desirably, the resonance hole 12d is formed in a top surface portion of the silencer body tube 10 corresponding to a gravity-direction uppermost region of the resonance chamber 22.

There is a fear that the resonance hole 12c formed in the bottom surface portion of the silencer body tube 10 is clogged by the oil stagnating within the resonance chamber 22. In this case, the vibration and the noise generated within the silencer body tube 10 can be introduced into the resonance chamber 22 through the resonance hole 12d formed in the top surface portion of the silencer body tube 10 and not into the clogged resonance hole 12c formed in the bottom surface portion of the silencer body tube 10.

Figure 8:
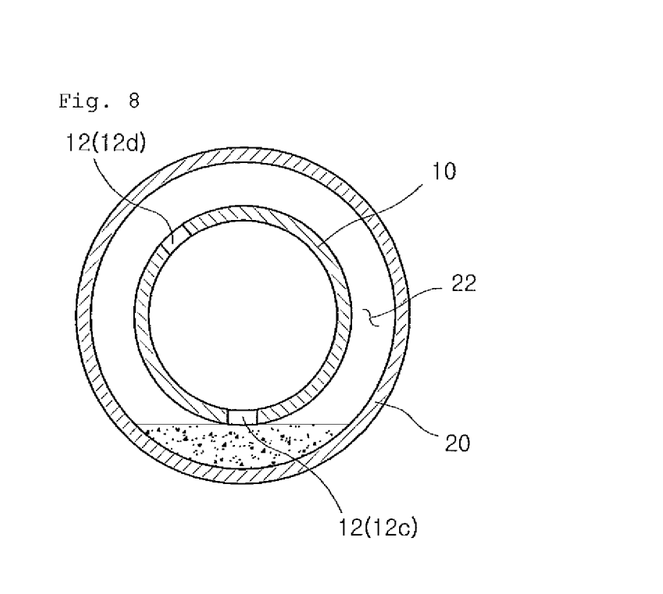
FIG. 8 is a sectional view showing a modified position of one of the resonance holes of the silencer according to the fourth embodiment illustrated in FIG. 6.
Figure 9:
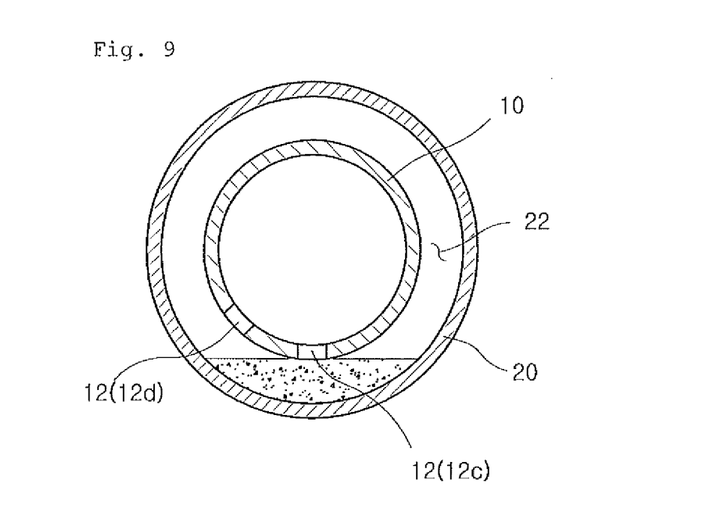
FIG. 9 is a sectional view showing another modified position of one of the resonance holes of the silencer according to the fourth embodiment illustrated in FIG. 6.

It is most desired that the resonance hole 12d is formed in the top surface portion of the silencer body tube 10. In some cases, as shown in FIGS. 8 and 9, the resonance hole 12d may be formed in the side surface portion of the silencer body tube 10.

Figure 10:
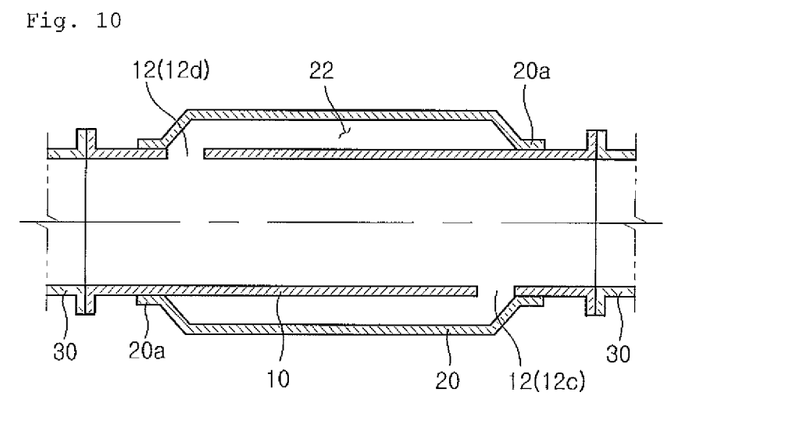
FIG. 10 is a sectional view showing a modified position of the resonance holes of the silencer according to the fourth embodiment illustrated in FIG. 6.

In FIG. 10, there is shown a modified example of the resonance holes 12 formed in the silencer body tube 10. The resonance holes 12 according to the modified example include a resonance hole 12c formed in a lower right portion of the silencer body tube 10 and a resonance hole 12d formed in an upper left portion of the silencer body tube 10.

In particular, the resonance hole 12c is formed in a gravity-direction lowermost right portion of the silencer body tube 10. The resonance hole 12d is formed in a gravity-direction uppermost left portion of the silencer body tube 10.

The reason for employing this configuration is to make sure that, even if the silencer body tube 10 is 180 degrees turned in the left-right direction in a process of assembling the silencer body tube 10 with the coolant pipes 30, a worker can properly cope with the situation. As clearly shown, a volume of the resonance chamber 22 is defined and fixed between the silencer body tube 10 and the external resonance tube 20.

Fifth Embodiment

Figure 11:
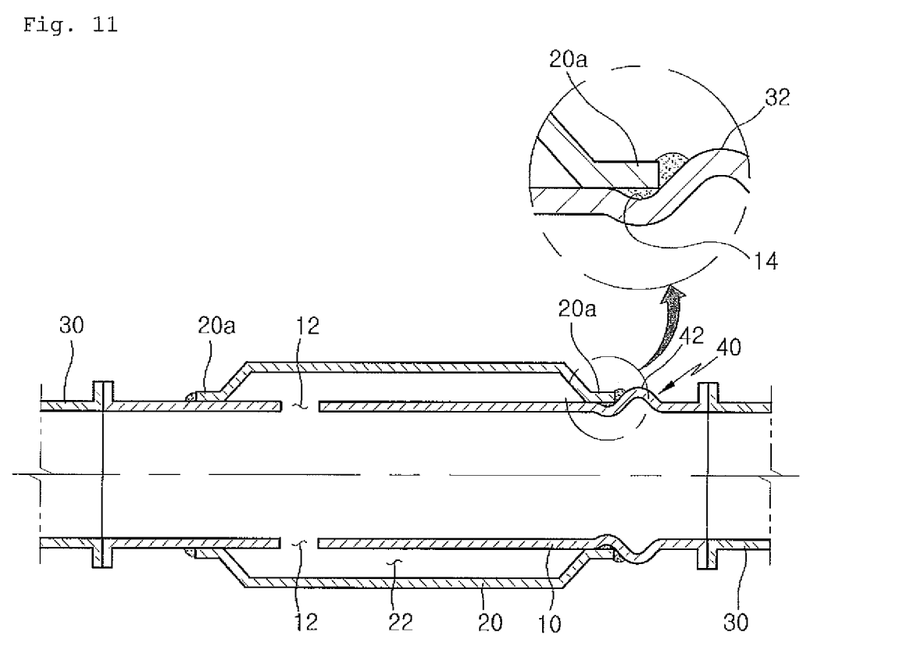
FIG. 11 is a sectional view showing a silencer for a vehicle air conditioning system according to a fifth embodiment of the present invention.

Next, a silencer for a vehicle air conditioning system according to a fifth embodiment of the present invention will be described with reference to FIG. 11.

In the silencer according to the fifth embodiment, the silencer body tube 10 includes a correct position indicating portion 40 formed on an outer circumferential surface thereof. The correct position indicating portion 40 is designed to indicate a correct position of the external resonance tube 20 with respect to the resonance holes 12. The correct position indicating portion 40 is composed of, e.g., a protrusion bead 42 protruding radially outward from the outer circumferential surface of the silencer body tube 10.

Prior to assembling the external resonance tube 20 with the silencer body tube 10, the protrusion bead 42 is formed in conformity with a correct position of the external resonance tube 20 relative to the resonance holes 12. Particularly, the protrusion bead 42 is previously formed in one of two axially spaced-apart regions of the silencer body tube 10 corresponding to the correct position of the external resonance tube 20.

When the external resonance tube 20 is fitted to the outer circumferential surface of the silencer body tube 10, one end portion of the external resonance tube 20 is stopped by the protrusion bead 42 of the correct position indicating portion 40. This enables a worker to recognize an accurate assembling position of the external resonance tube 20 relative to the resonance holes 12. Accordingly, the worker can assemble the external resonance tube 20 in an accurate position with respect to the resonance holes 12. As a result, the resonance holes 12 and the resonance chamber 22 are accurately arranged in a predetermined positional relationship with each other. This makes it possible to improve the noise absorption performance of the resonance chamber 22, thereby significantly enhancing the noise absorption performance of the silencer.

The protrusion bead 42 of the correct position indicating portion 40 is formed to protrude radially outward by subjecting the silencer body tube 10 to a forming process. An end fixing portion 20a of the external resonance tube 20 is welded to the protrusion bead 42 thus formed. Thus, the external resonance tube 20 arranged in the correct position is fixedly secured to the outer circumferential surface of the silencer body tube 10.

A circumferentially-extending welding groove 14 is formed on the outer circumferential surface of the silencer body tube 10 in a position corresponding to the end fixing portion 20a of the external resonance tube 20. The welding groove 14 is formed to protrude radially inward by subjecting the silencer body tube 10 to a forming process. The welding groove 14 is formed on the outer circumferential surface of the silencer body tube 10 between the end fixing portion 20a of the external resonance tube 20 and the protrusion bead 42.

When the end fixing portion 20a of the external resonance tube 20 is welded to the protrusion bead 42, a melt welding metal is accommodated within the welding groove 14. Particularly, the welding groove 14 enables the melt welding metal to flow into between the end fixing portion 20a of the external resonance tube 20 and the silencer body tube 10. Thus, the end fixing portion 20a of the external resonance tube 20 and the silencer body tube 10 are reliably welded together. This enhances the welding reliability of the external resonance tube 20 and the silencer body tube 10.

According to the silencer of the fifth embodiment, the accurate assembling position of the external resonance tube 20 is marked on the silencer body tube 10 in advance. The external resonance tube 20 is assembled on the basis of the mark. This makes it possible to easily and rapidly assemble the external resonance tube 20 in a correct position.

Since the external resonance tube 20 can be easily and rapidly assembled in a correct position, it is possible to easily and rapidly perform the assembling work of the external resonance tube 20 and to accurately arrange the external resonance tube 20 with respect to the resonance holes 12. This makes it possible to enhance the productivity and to significantly improve the noise absorption performance of the silencer. As clearly shown, a volume of the resonance chamber 22 is defined and fixed between the silencer body tube 10 and the external resonance tube 20.

Sixth Embodiment

Figure 12:
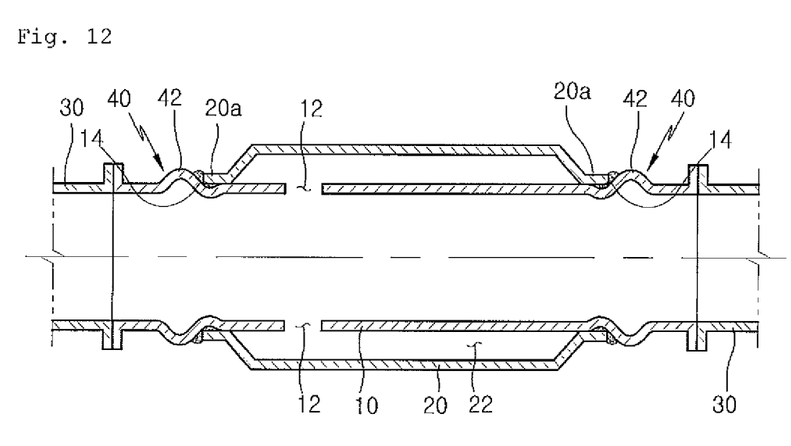
FIG. 12 is a sectional view showing a silencer for a vehicle air conditioning system according to a sixth embodiment of the present invention.

Next, a silencer for a vehicle air conditioning system according to a sixth embodiment of the present invention will be described with reference to FIG. 12.

In the silencer according to the sixth embodiment, the silencer body tube 10 includes two correct position indicating portions 40 formed at two points on an outer circumferential surface thereof. Particularly, the correct position indicating portions 40 are formed at two points corresponding to the correct position of the external resonance tube 20.

The two correct position indicating portions 40 are formed to extend radially outward in two positions on the silencer body tube 10 in conformity with the correct position of the external resonance tube 20. When the external resonance tube 20 is fitted to the outer circumferential surface of the silencer body tube 10, the opposite end portions of the external resonance tube 20 are aligned with the two correct position indicating portions 40.

This enables a worker to clearly recognize a correct assembling position of the external resonance tube 20 with respect to the resonance holes 12. Accordingly, the worker can assemble the external resonance tube 20 in an accurate position with respect to the resonance holes 12. As a result, the resonance holes 12 and the resonance chamber 22 are accurately arranged in a predetermined positional relationship with each other.

The two correct position indicating portions 40 of the present embodiment have the same structure as the correct position indicating portion 40 of the fifth embodiment. The welding structure of the silencer body tube 10 and the external resonance tube 20 is also identical with the welding structure described above in respect of the fifth embodiment. Thus, the detailed description thereon will be omitted.

In the silencer according to the sixth embodiment, the two correct position indicating portions 40 protrude radially outward from two axially spaced-apart regions of the silencer body tube 10. For that reason, when assembling the external resonance tube 20, the correct position indicating portions 40 may hinder the assembling work of the external resonance tube 20. However, the correct position indicating portions 40 are shown on an exaggerated scale in FIG. 12 for the purpose of clarity. In reality, the correct position indicating portions 40 have such a size that, during the assembling process, the external resonance tube 20 can be fitted between the correct position indicating portions 40 along the outer circumferential surface of the silencer body tube 10 as a result of the external resonance tube 20 being elastically deformed radially outward. As clearly shown, a volume of the resonance chamber 22 is defined and fixed between the silencer body tube 10 and the external resonance tube 20.

While certain preferred embodiments of the invention have been described above, the present invention is not limited to these embodiments. It is to be understood that various changes and modifications may be made without departing from the scope of the invention defined in the claims.

What is claimed is:

1. A silencer for reducing noise and vibration transmitted through a coolant pipe conveying a coolant gas and a lubricating oil therethrough, the silencer comprising:
   a silencer body tube including a resonance hole formed in an outer circumferential surface thereof; and
   an external resonance tube disposed around the outer circumferential surface of the silencer body tube, a resonance chamber having a total volume defined between the outer circumferential surface of the silencer body tube and the external resonance tube, the total volume of the resonance chamber absorbing a vibration and a noise of the coolant gas flowing through the silencer body tube, the resonance hole providing fluid communication between the silencer body tube and the resonance chamber and lubricating oil introduced into the resonance chamber flowing downward in a gravity direction and discharging into the silencer body tube through the resonance hole.

2. The silencer of claim 1, wherein the silencer body tube is coaxial with and in fluid communication with the coolant pipe to cause the coolant gas flowing through the coolant pipe to flow through the silencer body tube.

3. The silencer of claim 2, wherein the silencer body tube has an inner diameter that is substantially equal to an inner diameter of the coolant pipe.

4. The silencer of claim 1, wherein the silencer body tube is formed from a portion of the coolant pipe conveying the coolant gas therethrough.

5. The silencer of claim 1, wherein the total volume of the resonance chamber is fixed.

6. A silencer for reducing noise and vibration transmitted through a coolant pipe conveying a coolant gas and a lubricating oil therethrough, the silencer comprising:
   a silencer body tube including a resonance hole formed in an outer circumferential surface thereof; and
   an external resonance tube disposed around the outer circumferential surface of the silencer body tube, a resonance chamber having a fixed total volume defined between the outer circumferential surface of the silencer body tube and the external resonance tube, the fixed total volume of the resonance chamber absorbing a vibration and a noise of the coolant gas flowing through the silencer body tube, the resonance hole providing fluid communication between the silencer body tube and the resonance chamber and lubricating oil introduced into the resonance chamber flowing downward in a gravity direction and discharging into the silencer body tube through the resonance hole.

7. The silencer of claim 6, wherein the resonance hole is formed in a gravity direction lower portion of the silencer body tube.

8. The silencer of claim 7, wherein the silencer body tube is oriented at a predetermined angle with respect to a ground surface.

9. The silencer of claim 8, wherein the resonance hole is spaced from an end of the silencer body tube adjacent a ground surface.

10. The silencer of claim 7, wherein there is a plurality of resonance holes and the silencer body tube is oriented at a predetermined angle with respect to a ground surface and the resonance hole is arranged lower than any remaining ones of the plurality of resonance holes in the gravity direction.

11. The silencer of claim 7, wherein each of the plurality of resonance holes formed in the silencer body tube is formed in a portion of the silencer body tube corresponding to a gravity direction lower region of the resonance chamber having a length of less than or equal to one half of a total length of the resonance chamber.

12. The silencer of claim 11, wherein each of the plurality of resonance holes formed in the silencer body tube is formed in a portion of the silencer body tube corresponding to a gravity direction lowermost region of the resonance chamber.

13. The silencer of claim 10, wherein the plurality of resonance holes includes a first resonance hole formed in a gravity direction lowermost portion of the silencer body tube and a second resonance hole formed in a gravity direction uppermost portion of the silencer body tube.

14. The silencer of claim 6, wherein the silencer body tube includes a first correct position indicating portion formed therein to indicate a correct placement of a first end of the external resonance tube relative to the silencer body tube.

15. The silencer of claim 14, wherein the silencer body tube includes a second correct position indicating portion formed in the silencer body tube axially spaced apart from the first correct position indicating portion, wherein the second correct position indicating portion corresponds to a position of a second end of the external resonance tube.

16. The silencer of claim 15, wherein the first correct position indicating portion includes a protrusion bead formed to protrude from a portion of the outer circumferential surface of the silencer body tube corresponding to a position of one end of the external resonance tube.

17. The silencer of claim 16, wherein the protrusion bead protrudes radially outwardly from the outer circumferential surface of the silencer body tube and is formed by subjecting the silencer body tube to a forming process, and wherein the external resonance tube is welded to the protrusion bead.

18. The silencer of claim 17, wherein the silencer body tube further comprises a welding groove formed on the outer circumferential surface of the silencer body tube, wherein the welding groove is configured to receive a melted welding metal when the external resonance tube is welded to the protrusion bead.

* * * * *